United States Patent [19]

Hiscock et al.

[11] Patent Number: 4,617,223
[45] Date of Patent: Oct. 14, 1986

[54] REINFORCED PAPERBOARD CARTONS AND METHOD FOR MAKING SAME

[75] Inventors: Donald F. Hiscock, Columbus; Joe A. Jacomet, Westerville; Deborah H. Carter, Columbus, all of Ohio

[73] Assignee: The Mead Corporation, Dayton, Ohio

[21] Appl. No.: 670,415

[22] Filed: Nov. 13, 1984

[51] Int. Cl.$^4$ .................. B32B 29/00; D06M 13/34; B65D 5/62
[52] U.S. Cl. .................. 428/211; 428/131; 206/161; 8/192; 229/16 R; 224/906; 427/411; 427/285; 427/288; 493/148; 493/328
[58] Field of Search .................. 428/425.1, 211, 537.5, 428/131; 206/161, 193; 8/192, DIG. 11; 229/16 R, 485 C; 224/906; 427/411, 285, 288; 493/148, 328, 467

[56] References Cited

U.S. PATENT DOCUMENTS

| | | | |
|---|---|---|---|
| 2,897,094 | 7/1959 | Hayes et al. | 8/192 |
| 3,413,144 | 11/1968 | LaCombe et al. | 428/425.1 |
| 3,778,302 | 12/1973 | Dahl | 428/425.1 |
| 3,953,169 | 4/1976 | Igarashi et al. | 428/425.1 |
| 3,967,016 | 6/1976 | Schneller et al. | 428/425.1 |
| 4,354,890 | 10/1982 | Maffey | 427/288 |

Primary Examiner—John E. Kittle
Assistant Examiner—Thomas C. Saitta
Attorney, Agent, or Firm—Biebel, French & Nauman

[57] ABSTRACT

A selectively reinforced paperboard carton having areas of reinforcement formed by impregnating the uncoated paperboard carton blank in patterned areas with a polyisocyanate which reacts with hydroxyl groups within the paperboard to form a cured polyurethane reinforcement. The preferred polyisocyanate is polymethylene polyphenylisocyanate.

16 Claims, 1 Drawing Figure

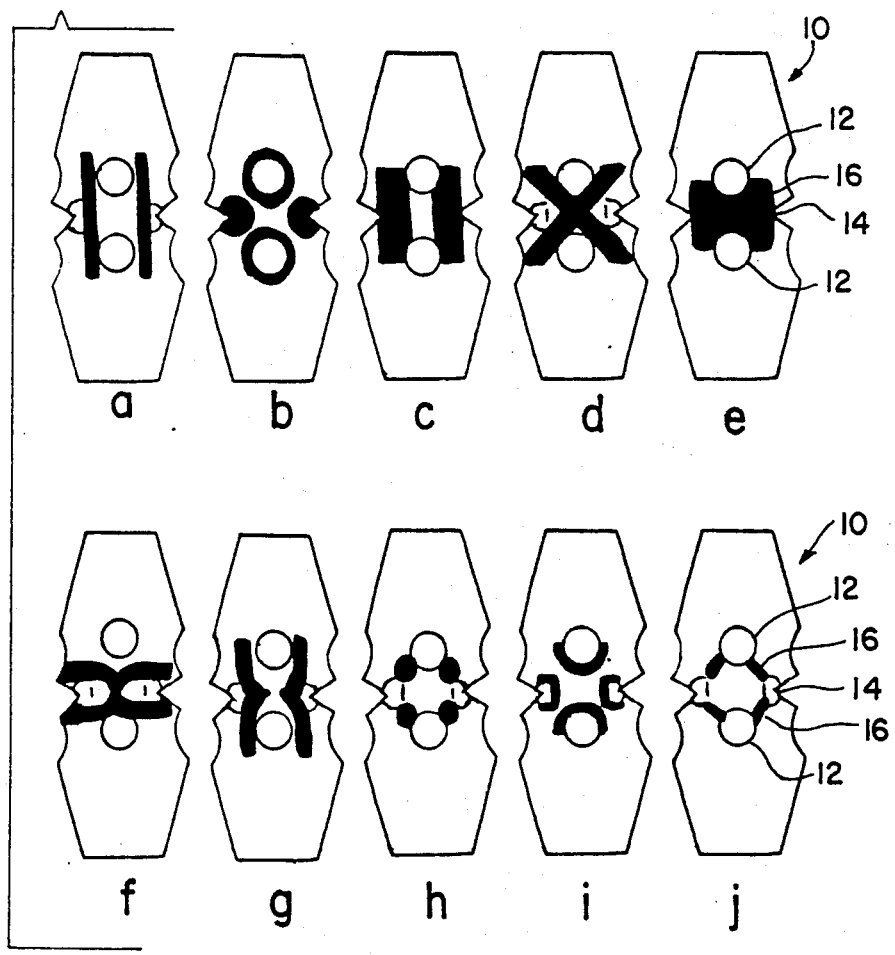

REINFORCED PAPERBOARD CARTONS AND METHOD FOR MAKING SAME

BACKGROUND OF THE INVENTION

The present invention relates to reinforced paperboard cartons and, more particularly, it relates to selective reinforcement of paperboard cartons by area-wise impregnation of strategic portions of the cartons with a polyisocyanate.

Paperboard cartons are widely used in the packaging area. For example, the Mead Corporation, assignee of the present invention, markets under the trademark Cluster-Pak, a paperboard carton for carrying glass bottles such as bottles of soft drinks. That carton is manufactured under one or more of the following U.S. Pat. Nos.: 3,169,691; 3,233,483; 3,517,876; 3,519,127; 3,807,624; 4,077,095; 4,084,693; and 4,093,116.

Generally, the Cluster-Pak carton has at the top a pair of fingerholes and a series of circular openings through which the glass soft drink bottle necks extend. These fingerholes and circular openings are die cut from the paperboard either before or after coating and printing. Another series of apertures is die cut in the base of the carton so that the paperboard blank can be appropriately folded and mechanically locked to form the final package.

As a result of the formation of fold lines and die cut holes, openings and apertures, areas of weakness are formed in the paperboard carton. In particular, it has been found that two locations are prone to tensile failure: (1) the fingerholes in the top of the carton, and (2) the apertures or "heels" in the bottom of the carton which are adjacent the base of the glass soft drink bottle. The fold lines are also areas of concern.

In any of these areas if there is a significant failure, the whole carton or one or more bottles may drop from the carrying hand, hit the floor, and break. Obviously, such losses are to be avoided if at all possible. As a result, it has been the practice to use a heavier basis weight paperboard than might otherwise be required in order to provide a margin of safety in terms of potential tensile failures. This is expensive and, even then, failures do on occasion occur.

Accordingly, it would be desirable to reinforce the paperboard carton in order to prevent such failures. However, previous efforts to do so have a number of drawbacks. An overall plastic coating or lamination is expensive. Adhering bands of selective reinforcement at strategic locations requires special equipment and results in a non-uniform increase in thickness of the paperboard blank which presents stacking, shipment and handling problems to the soft drink bottlers.

Of course, it is known that impregnation with certain resins may increase compressive strength, tensile strength, tearing strength, flexibility, moisture penetrability, etc., of paperboards without neccessarily increasing the thickness of the paperboard blank. See, for example, Igarashi et al, U.S. Pat. No. 3,953,169 wherein it is disclosed that a paperboard impregnated with polyurethane resin having a specific NCO content and an average molecular weight at the rate of 0.05 to 5.0 weight percent relative to the paperboard has excellent mechanical properties such as compressive strength, tensile strength, tearing strength, folding endurance, etc. even in a wet state. The polyurethane resin of Igarashi et al may be either a one-component polyisocyanate derived from tolylene diisocyanate or a two-component polyisocyanate composition of polyol and polyisocyanate derived from tolylene diisocyanate. It is applied from an organic solvent solution by dipping or coating and then dried by steam heating at approximately 130° C. for about 5 seconds. See also LaCombe et al, U.S. Pat. No. 3,413,144, which discloses a particular air-curable polyurethane for treatment or coating of textiles and paper.

Still, the particular systems of Igarashi et al and LaCombe et al are not suitable for use in the selective reinforcement of paperboard cartons and to our knowledge no one has previously suggested area-wise impregnation of strategic portions of paperboard cartons with a polyisocyanate.

As such, the need remains for an improved system for selectively reinforcing paperboard cartons to prevent mechanical failure of those cartons in use and, possibly, permit use of lower caliper paperboard which still has sufficient tensile strength and tenacity that such failures can be minimized.

SUMMARY OF THE INVENTION

That need is met by the present invention which provides a reinforced paperboard carton having increased tensile strength compared with a non-reinforced carton of the same caliper. The method for achieving this result involves selectively impregnating the paperboard blank from which the carton is formed with a polyisocyanate which reacts with hydroxyl groups within the paperboard to form a cured polyurethane reinforcement.

The preferred polyisocyanate is, thus, a liquid one which has a viscosity which permits easy impregnation into uncoated paperboard and which reacts with water. Preferably it is a methylene diisocyanate (MDI); although other polyisocyanates may be used. Most preferably it is a polymethylene polyphenylisocyanate such as Mondur MR from Mobay Chemical Corp. of Pittsburg, Pa. Mondur MR is a liquid polyisocyanate having a viscosity at 25° C., m Pa - s (milli pascals - seconds) of approximately 200; has an NCO content of around 31.5%; a specific gravity of approximately 1.24 g/cm$^3$ at 25° C.; and a boiling point of 406° F. at 5 mm Hg.

Although the Mondur MR isocyanate is not designed to be used as a single component resin (normally it is reacted with a polyol to form a cured urethane polymer), it has been found that it reacts with hydroxyl groups in the paperboard to form a cured polyurethane. It is believed that this is due to either the moisture content of the paperboard or the presence of free hydroxyl groups in the cellulose itself or both.

The result is a polyurethane reinforcement which, at the preferred levels, give a 15–25% increase in tensile strength. Thus, printing a liquid polymethylene polyphenylisocyanate onto the uncoated side of a paperboard blank in selected patterned areas at the preferred rate of 0.03–0.08 g/in$^2$ gives the desired increase in tensile strength. The preferred patterned areas are at or around the fold lines, fingerholes, openings or apertures in the paperboard blank. The liquid polyisocyanate may be applied by a number of coating or printing means such as flexographic, gravure, stencil, etc.

Preferably the liquid polymethylene polyphenylisocyanate is flexographically printed on the uncoated side of paperboard blanks prior to the normal die cutting, coating and printing steps. This is possible in a production line at rates of 400–600 feet per minute because the liquid polyisocyanate is solvent-free, impregnates quickly into the paperboard, rapidly air-dries at room temperature to the touch sufficiently to prevent blocking of the later stacked paperboard blanks, and develops most of its full strength in 2–3 days.

This permits reinforcement of paperboard cartons of normal caliper to substantially increase the tensile strengh of those cartons. Alternatively, it permits a reduction in caliper without any decrease in tensile strength. This gives attendant cost savings. For example, a reduction from 25 point to 20 point board, which is possible with the selective reinforcement of the present invention, could result in a savings of approximately 10 percent in the cost of production of the paperboard carton and yet not result in any loss of strength or safety.

Accordingly, it is an object of the present invention to provide a reinforced paperboard carton having selective polyurethane resin reinforcement and a method for impregnating a paperboard blank with a polyisocyanate to form the reinforced paperboard carton. Other objects and advantages of the invention will be apparent from the following description, the accompanying drawings and the appended claims.

BRIEF DESCRIPTION OF THE DRAWING

FIG. 1 schematically shows various patterns, a–j, of selective reinforcement on a portion of a paperboard carton blank.

DETAILED DESCRIPTION OF THE PREFERRED EMBODIMENTS

With reference to FIG. 1, there is shown various patterns of selective reinforcement around the fingerholes in a paperboard blank for a soft drink bottle carton. The portion of the paperboard blank 10 shown is the central one of a six-bottle carton of 20 point paperboard. It measures approximately 5 inches in width and 10.75 inches in length and was used for the testing reported in Tables I and II. Openings 12 are designed to receive the necks of soft drink bottles, fingerholes 14 are designed for two-finger gripping of the carton, and patterns 16 show the various areas, a–j, of selective reinforcement tested (the same numerals being applicable in each instance).

The reinforcement patterns of FIG. 1 are only illustrative and other areas of reinforcement, either at or around the bottle neck openings or fingerholes, along the fold lines, or at or around the apertures in the bottom of the carton are also contemplated. Likewise, the selective reinforcement of the present invention may be used in other paperboard packaging products and not just soft drink bottle cartons.

The selective reinforcement is provided by impregnating in the desired patterned areas a polyisocyanate which reacts with hydroxyl groups to form a cured polyurethane. The preferred polyisocyanate, and the one used for preparation of the test runs set forth in Tables I and II, is polyethylene polyphenylisocyanate available under the trademark Mondur MR from Mobay Chemical Corp of Pittsburg, Pa. These materials have the advantage of being relatively inexpensive, having a low viscosity, being capable of use as a solvent-free single component system, having good impregnating features, and being easy to cure. As mentioned, it cures upon air drying at room temperature by reaction with the hydroxyl groups in the paperboard. Heat may be used to increase the cure time, but is generally not necessary since Mondur MR in the present use becomes non-tacky and non-blocking in a matter of seconds (less than one minute) and develops most of its ultimate strength in 2–3 days, and obtains full strength in about one week.

Various methods of patterning the liquid polyisocyanate onto the uncoated side of the paperboard blank may be used. Flexography, gravure printing, stenciling, etc. are all applicable. The preferred commercial system would be a flexographic printing process used in a continuous line before the normal die-cutting, coating and printing operations. However, for the purpose of the runs reported in Tables I and II, an experimental stencil operation was used as set forth hereafter in Example I.

EXAMPLE I

All patterns were applied to carton-cutout specimens, as shown in FIG. 1, by #0 wire wound rod draw-downs over masks cut from 0.002 inch Mylar film which were lightly glued to the paperboard blank with 3M's Spray 77 adhesive. This technique gave close to the same weight per unit area of resin for all patterns (FIG. 1, a–j), but let the actual area vary according to the shape of the mask. Tensile strength testing (in terms of pounds of load) of the resulting specimens was done in an Instron machine equipped with specially designed pneumatic clamps. A crosshead speed of 0.2 inches/minutes was used. The results are set forth in Table I:

TABLE I

SUMMARY OF FAILURE LOADS OF CARTON CUT-OUT TEST SPECIMENS REINFORCED WITH MONDUR MR POLYMERIC ISOCYANATE RESIN USING VARIOUS PATTERNS

| Sample Number | Figure Pattern | Pattern Area $in^2$ | Reinforcement Add-on, g | $g/in^2$ | Failure Load, Lbs. |
|---|---|---|---|---|---|
| 1 | None/Control | — | 18.93 | 0 | 126 |
| 2 | Full | 75.03 | 2.29 | .031 | 136 |
| 3 | FIG. 1a | 5.00 | 0.44 | .088 | 145 |
| 4 | FIG. 1a | 5.00 | 0.25 | .050 | 150 |
| 5 | FIG. 1a | 5.00 | 0.40 | .080 | 147 |
| 6 | FIG. 1a | 5.00 | 0.32 | .064 | 140 |
| 7 | FIG. 1b | 9.81 | 0.49 | .050 | 145 |
| 8 | FIG. 1c | 8.13 | 0.45 | .055 | 154 |
| 9 | FIG. 1d | 6.67 | 0.42 | .063 | 147 |
| 10 | FIG. 1e | 6.36 | 0.40 | .063 | 135 |
| 11 | FIG. 1f | 5.91 | 0.47 | .080 | 130 |
| 12 | FIG. 1g | 5.91 | 0.42 | .071 | 145 |
| 13 | FIG. 1h | 3.55 | 0.24 | .070 | 146 |
| 14 | FIG. 1i | 3.48 | 0.19 | .055 | 138 |
| 15 | FIG. 1j | 2.85 | 0.22 | .077 | 129 |

As noted in Table I, the control specimens (Sample number 1) had a mean failure load of 126 pounds. The highest reinforced values were for sample number 8 at 154 pounds, representing a 22% increase in tensile strength for a 0.055 g/in² impregnation. Sample numbers 3, 4, 5, 7, 9, 12 and 13 also give improvements in tensile strength of greater than 15% and, therefore, fall within the preferred range of 15–25% increases tensile strength. Sample number 3 was tested after 3 weeks cure, sample number 4 after 2 weeks cure, sample number 5 after 1 week cure, and the remaining samples after 2 days cure in a constant temperature/humidity conditioning room. In general, the polyurethane resin seems to have developed a large part of its strength after two days of curing. Additional time appears to result in some additional strength, with about one week being the time required for full strength.

The most preferred runs are represented by samples 4 and 13, where the highest tensile strength increases, i.e., 19% and 16%, were achieved at the lowest add on amounts, i.e., 0.25 and 0.24 grams. These represent patterns FIG. 1a and FIG. 1h.

EXAMPLE II

In order to confirm the results obtained in Example I, a larger number of samples having patterns FIG. 1a and FIG. 1h (15 of each) were prepared and tested. The same preparations and test procedures set forth in Example I were used. Table II reports the mean results:

TABLE II

FAILURE LOADS OF CARTON-CUTOUT SPECIMENS OF REINFORCED AND UNREINFORCED BOARDS

| Sample Number | Description | Pattern Area in$^2$ | Resin Add-on g/Specimen Mean | S.D. | g/in$^2$ | Failure Load, lbs. Mean | S.D. | % Increase |
|---|---|---|---|---|---|---|---|---|
| 1 | Pattern FIG. 1a | 5.0 | 0.27 | 0.04 | .054 | 154 | 10.1 | 25% |
| 2 | Pattern FIG. 1h | 3.55 | 0.18 | 0.02 | .051 | 144 | 9.0 | 17% |
| 3 | Control 20 Point Board | — | 18.92 | 0.21 | 0 | 123 | 9.2 | — |

These tests on larger numbers of specimens confirm the reinforcing effect of the polyisocyanate impregnated selectively reinforced paperboard. On an average, an improvement in failure load of 20 percent was realized at a weight increase of less than 1 percent (based on the estimated weight of an unreinforced 20 point paperboard carton).

While the article and method herein described constitutes preferred embodiments of the invention, it is to be understood that the invention is not limited to these precise articles and methods, and that changes may be made therein without departing from the scope of the invention, which is defined in the appended claims.

What is claimed is:

1. A reinforced paperboard carton blank comprising a paperboard blank having therein a pair of fingerholes, fold lines, and a series of openings for receiving a plurality of liquid containers, said blank being impregnated with a polyisocyanate in areas located to increase the tensile strength of said blank adjacent said fingerholes and/or openings such that said container does not readily break when liquid containers are carried therein, said polyisocyanate being a polyisocyanate which reacts with hydroxyl groups in said paperboard to form a cured polyurethane reinforcement.

2. The reinforced paperboard carton blank of claim 1 wherein said polyisocyanate is polymethylene polyphenylisocyanate.

3. The reinforced paperboard carton blank of claim 2 wherein said paperboard blank has fold lines and is die-cut to form fingerholes, openings and apertures.

4. The reinforced paperboard carton blank of claim 3 wherein said selected areas impregnated with said polyisocyanate are patterned at or adjacent said fold lines, fingerholes, or openings to increase the tensile strength of said paperboard at or adjacent said fold lines, fingerholes, or openings.

5. The reinforced paperboard carton blank of claim 4 wherein said selected areas include at least a portion of said fold lines.

6. The reinforced paperboard carton blank of claim 2 wherein said selected areas impregnated with said polyisocyanate are formed by printing a liquid polymethylene polyphenylisocyanate in patterned areas on an uncoated side of said paperboard blank.

7. The reinforced paperboard carton blank of claim 5 wherein said liquid polymethylene polyphenylisocyanate has a viscosity at 25° C., mPa-s of approximately 200.

8. The reinforced paperboard carton blank of claim 5 wherein said liquid polymethylene polyphenylisocyanate is printed in said patterned areas at the rate of 0.03–0.08 g/in$^2$.

9. The reinforced paperboard carton blank of claim 2 wherein said tensile strength of said reinforced paperboard carton is 15–25% greater than a non-reinforced paperboard carton.

10. A method of reinforcing paperboard carton blanks comprising:
    providing a paperboard blank having fingerholes, fold lines, and a series of openings therein for receiving a plurality of liquid containers, and
    impregnating selected areas of said blank with a polyisocyanate which reacts with hydroxyl groups within said paperboard to form a cured polyurethane reinforcement, said selected areas being located to increase the tensile strength of said paperboard adjacent said fingerholes and/or said openings such that when said blank is folded into a carton and liquid containers are carried therein, said blank does not readily tear.

11. The method of claim 10 wherein said polyisocyanate is polymethylene polyphenylisocyanate.

12. The method of claim 11 wherein said polymethylene polyphenylisocyanate is a liquid having a viscosity of 25° C., mPa-s of approximately 200.

13. The method of claim 12 wherein said liquid polymethylene polyphenylisocyanate is printed in patterned areas on an uncoated side of said paperboard blank.

14. The method of claim 13 wherein said printing is done flexographically at 400–600 feet per minute.

15. The method of claim 13 wherein said liquid polymethylene polyphenylisocyanate is printed in said patterned areas at the rate of 0.03–0.08 g/in$^2$.

16. The method of claim 13 further including air drying said liquid polymethylene polyphenylisocyanate at room temperature.

* * * * *